Aug. 19, 1941.   J. W. McCAUSLAND   2,252,719
CATALYTIC REACTOR
Filed July 24, 1940   3 Sheets-Sheet 1
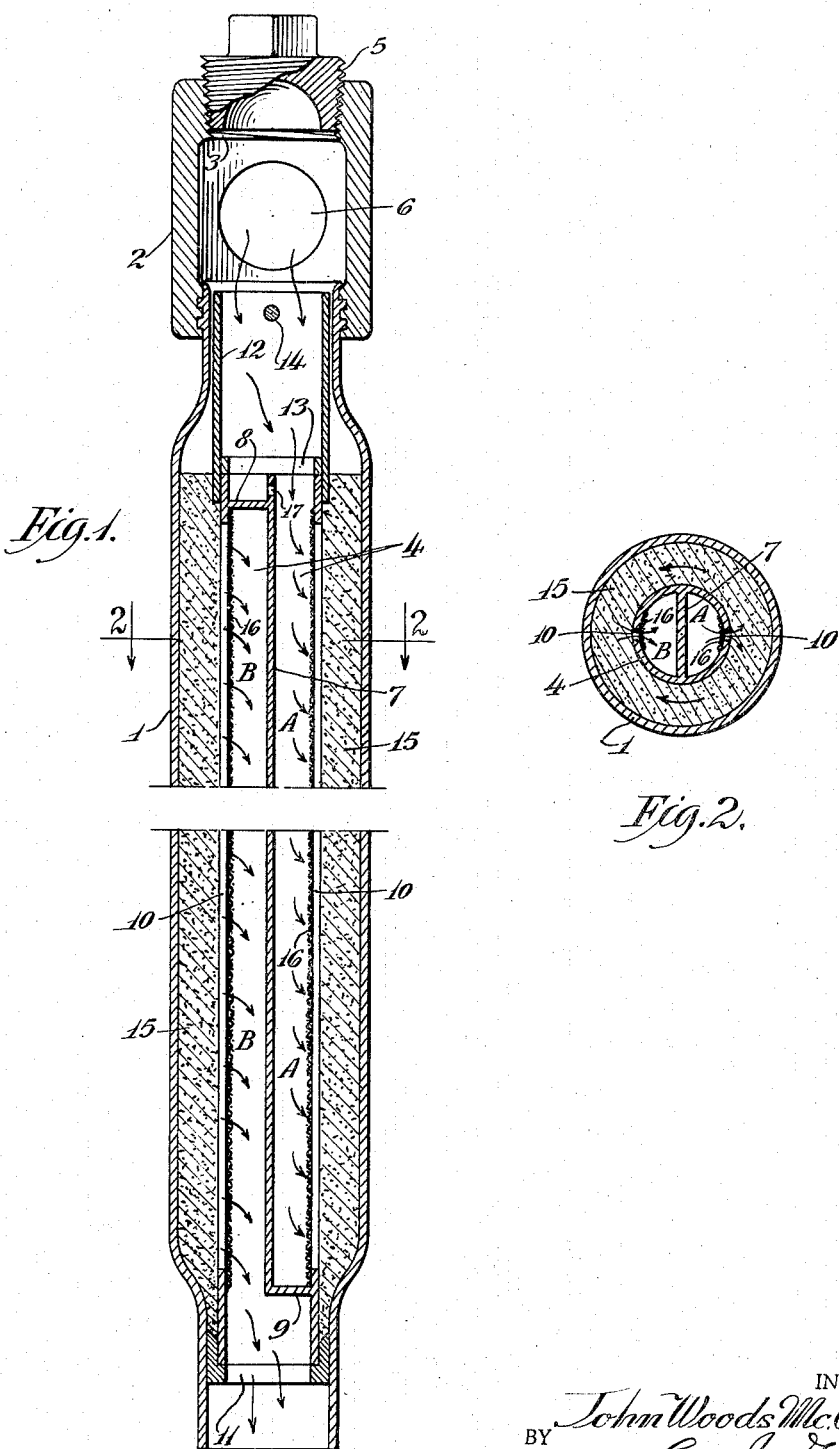
INVENTOR.
John Woods McCausland
BY Lee J. Gary
Attorney.

Aug. 19, 1941.  J. W. McCAUSLAND  2,252,719
CATALYTIC REACTOR
Filed July 24, 1940   3 Sheets-Sheet 2

INVENTOR.
John Woods Mc.Causland

Aug. 19, 1941.   J. W. McCAUSLAND   2,252,719
CATALYTIC REACTOR
Filed July 24, 1940   3 Sheets-Sheet 3

INVENTOR.
John Woods Mc.Causland
BY Lee J. Gary
Attorney.

Patented Aug. 19, 1941

2,252,719

UNITED STATES PATENT OFFICE 2,252,719

CATALYTIC REACTOR

John Woods McCausland, Chicago, Ill., assignor to Universal Oil Products Company, Chicago, Ill., a corporation of Delaware Application July 24, 1940, Serial No. 347,142

8 Claims. (Cl. 23—288)

The invention is directed to an improved form of reactor which is adapted to use in conducting reactions of the type employing a fixed bed of granular contact material which may be either a relatively inert substance acting to increase the intimacy of contact between the reactants or may possess catalytic activity for directing or promoting the desired reaction or may actually enter into the reaction.

One of the primary objects of the invention is to provide a reactor in which relatively low pressure drop is encountered from the inlet to the outlet thereof. This is not only important in reducing operating expenses by reducing the pressure required at the inlet of the reactor and reducing the required strength of the equipment due to the lower maximum pressure required, but is essential in conversion reactions, such as, for example, the dehydrogenation of butanes to butylenes and the dehydrogenation of butylenes to butadiene, where the operating pressure is critical and must be maintained within relatively narrow limits at a substantially constant value throughout the reaction zone. Low pressure drop through the reactor is particularly important in processes wherein the conversion reaction is necessarily conducted at relatively low pressures since, under such conditions, a given drop in pressure through the reaction zone represents a greater percentage of the desired operating pressure than when the latter is of a higher order.

In conducting reactions of the general character above mentioned in conventional reactors employing one or more fixed beds of granular contact material through which the reactants and resulting conversion products are passed, a major portion of the pressure drop or differential in pressure between the inlet and the outlet of the reactor is due to the resistance to flow offered by the bed or beds of contact material. In the improved apparatus provided by the invention this factor is greatly reduced by employing a relatively short path of travel through the bed of contact material for the fluid reactants and resulting conversion products.

Relatively short travel with a good distribution of the fluid reactants throughout the bed of catalyst or contact material is accomplished in the apparatus herein provided by employing elongated concentric tubes, the bed of catalyst or contact material being disposed in the annular space provided between the concentric tubes. The central tube is divided by a longitudinal partition into two compartments and diametrically opposite openings or slots are provided through the wall of the central tube, provision being made for supplying a stream of the fluid reactants to be converted to one of the longitudinal compartments of the central tube and removing fluid conversion products from the other longitudinal compartment of the central tube. The fluid reactants flow from the longitudinal inlet compartment of the central tube through the longitudinal slot or opening therein into the catalyst bed, and conversion products resulting from contact between the fluid reactants and the granular material of the catalyst bed pass from the latter through the diametrically opposite longitudinal slot or opening in the central tube into the longitudinal outlet compartment thereof, from which they are removed. Thus, the path of travel of the reactants and resulting conversion products through the bed of contact material is through approximately one-half of the annular space between the concentric tubes. Their length of travel through the catalyst bed from the inlet to the outlet compartment of the central tube is a function of the diameters of the concentric tubes and, in designing the apparatus, may be calculated to meet requirements and give the necessary space velocity or contact time with relatively low pressure drop. Space velocity is an important factor in most catalytically promoted reactions and, as here used, is a figure representing the quantity of reactants passed through the catalyst bed in a given time per unit volume of space occupied by the latter. When expressed as cubic feet of gas (corrected to standard conditions), per hour, per cubic foot of space occupied by the catalyst, it is usually of a high order in dehydrogenating reactions, such as above mentioned, ranging, for example, from 1000 to 5000 or thereabouts.

The accompanying drawings diagrammatically illustrate several specific forms of reactors embodying the features of the invention.

Fig. 1 represents a longitudinal section of one form of reactor tube provided by the invention and Fig. 2 represents a cross-sectional view of the same reactor tube taken along a plane indicated by line 2—2 in Fig. 1.

Figure 3:
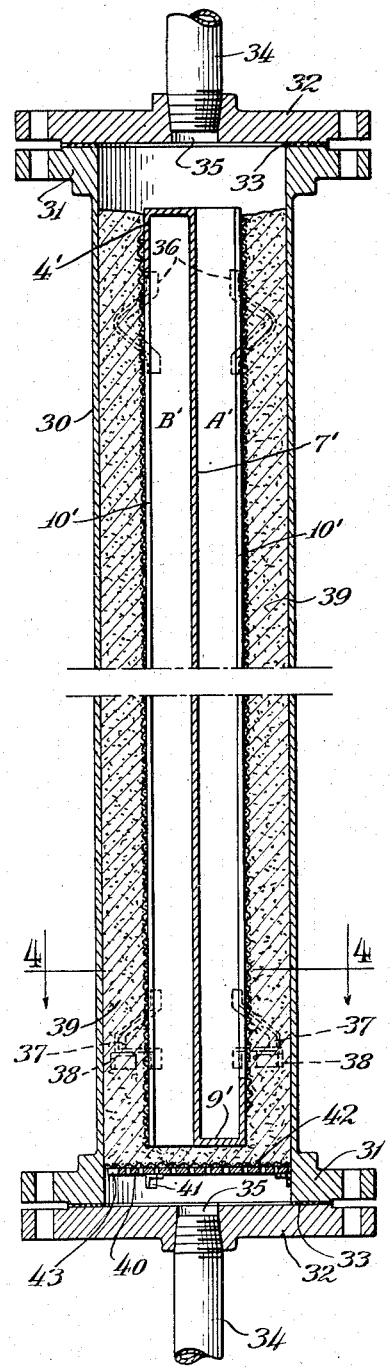
Fig. 3 is a longitudinal section of another specific form of reactor tube provided by the invention and Fig. 4 represents a cross-sectional view of the same reactor tube taken along a plane indicated by line 4—4 in Fig. 3.

Referring to Figs. 1 and 2, the outer tube of the assembly is designated by the reference numeral 1 and comprises a pipe or cylindrical tube of suitable metal or metallic alloy which, in the particular case here illustrated, is swaged to a reduced diameter adjacent its opposite ends, although bushings may be employed, when desired, instead of swaged ends. The smaller diameter sections of tube 1 may, when desired be rolled into or otherwise attached to headers or inlet and outlet fittings. Such a fitting is shown at one end of the tube in Fig. 1 and is designated by the reference numeral 2. An opening 3 is provided in header 2, directly opposite the tube port therein, of sufficiently large diameter to permit the insertion and removal therethrough of the inner tubular member 4 of the assembly. A removable closure member is provided for port 3 and, in the case here illustrated, comprises plug 5 which is threaded and screwed into the threaded port 3. A stream of fluid reactants may be admitted to the upper header 2 through port 6 provided therein and a stream of fluid convension products may be removed from a similar lower header, not shown, through a similar port provided therein, this arrangement giving a general downward flow, or when desired, a general upward flow may be obtained by reversing the inlet and outlet ports.

The inner tubular member 4 comprises two compartments, designated as A and B in the drawings, formed between the outer wall of the tube and a centrally disposed longitudinal partition 7 which is secured to the outer walls by welding or in any other manner which will prevent leakage past the partition between the two compartments. Compartment B of the central tube is closed adjacent its upper end, as indicated at 8 in Fig. 1, and compartment A is closed adjacent its lower end, as indicated at 9 in Fig. 1. A longitudinal slot 10 is provided through the outer wall of tube 4 on one side of partition 7 and a similar longitudinal slot 10 is provided in the wall of tube 4 on the opposite side of partition 7 and preferably the slots are at a diametrically opposite point on the circumference of the tube.

When the reactor tube is assembled for use, the lower end of the inner tubular member 4 extends into the lower, small diameter end of the tube 1 and is supported and prevented from passing through the latter on a suitable stop 11 which may comprise a metallic ring, as in the case here illustrated, or spaced lugs welded or otherwise secured to the walls of the small diameter portion of tube 1. This arrangement aligns the inner tube at its lower end in a substantially central location within the outer tube. A sleeve 12 adapted to pass through plug port 3 and through the relatively small diameter portion of tube 1 engages at its lower end the upper end of tube 4 to retain the latter in a substantially central location. Sleeve 12 has an additional function which will be later explained and is provided with a stop 13 which may comprise a relatively thin ring or spaced lugs welded or otherwise attached to the wall of member 12 inside the latter. Stop 13 rests upon the upper end of tube 4 and prevents sleeve 12 from slipping down over tube 4 out of engagement with the small diameter upper portion of tube 1. A suitable bar or the like 14, extending across the interior of sleeve 12 and secured to the walls of the latter, serves as a means of grasping the sleeve to facilitate its insertion and removal from the assembly.

The annular space which is provided between the concentric tubes 1 and 4 is substantially filled, when the apparatus is in use, with a bed of solid granular contact material, indicated at 15, and when the particle size of the contact material is smaller than the required size of slots 10, a suitable screen of sufficiently small mesh to prevent passage of the contact material therethrough is preferably provided over the slots on either the interior or outer surface of the cylindrical wall of tube 4. In the case here illustrated, a screen 16 is provided inside tube 4 over each of the slots 10 and may be spot-welded or otherwise secured to the wall of the tube. When disposed on the outer surface of tube 4 it may be wrapped around the latter, when desired, and secured thereto in any conventional manner.

To introduce the granular contact material into the annular space between the concentric tubes, plug 5 and sleeve 14 are removed from the assembly and the granular material is poured into place through plug port 3, preferably after the open upper end of compartment A has been temporarily plugged in any convenient manner, not illustrated, to prevent the contact material from falling into this space.

To remove the bed of contact material for replacement or reactivation thereof, plugs 5 in the upper and lower headers are removed, sleeve 12 is withdrawn and the inner tube is grasped, for example, by means of an opening 17 provided through partition 7 adjacent its upper end, and lifted clear of the relatively small diameter lower section of tube 1, allowing the contact material to fall from the annular space through the small diameter lower portion of tube 1 and through the lower header and open plug port therein, not illustrated. To replace the bed of contact material, the central tube 4 is simply lowered to its former position with the lower end thereof resting on stop 11 and the contact material is poured into the annular space through the upper plug port 3, as above described, before the upper plug 5 and sleeve 12 are replaced.

Assuming that the reactants to be converted are supplied to the upper end of the reactor tube assembly through port 6 in header 2, they pass downwardly through sleeve 12 into compartment A of tube 4. From compartment A the reactants pass through the slot 10 of this compartment and flow through the bed of contact material in the general direction indicated by the arrows in Fig. 2. The resulting conversion products and any unconverted reactants or inert components of the stream of fluid reactants enter compartment B of tube 4 through the slot 10 of this compartment and are discharged from the lower end of tube 4 and through the lower header not shown. With the reactants to be converted supplied to the reactor tube through a lower header similar to header 2 but not illustrated, the flow through the apparatus is exactly the reverse of that above described. It is thus apparent that either upward or downward flow, whichever is most convenient, may be employed in this type of apparatus.

Figure 4:
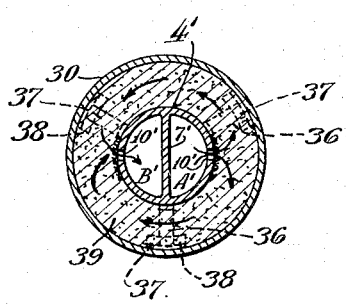

In Fig. 3, the central tube 4' is quite similar in construction to the central tube 4 of Figs. 1 and 2. It has a central longitudinal partition 7' which, like partition 7 of tube 4, is slotted along diametrically opposite sides and on opposite sides of partition 7' with slots 10' similar to slots 10 in Figs. 1 and 2. The right-hand longitudinal compartment A' of Fig. 4 is closed at its lower end as indicated at 9' and the left-hand longitudinal partition B' is closed at its upper end as indicated at 8'. Suitable screens 16' are provided over the slots 10', being disposed, as in the case illustrated in Fig. 3, on the outside surface of tubular element 4'.

The outer tube 30 of the apparatus illustrated in Fig. 3 replaces the outer tube 1 of Figs. 1 and 2 and, instead of being swaged at its opposite ends, is provided with upper and lower flanges 31. The upper and lower ends of tube 30 are closed by flanges 32 attached by suitable bolts, not illustrated, to flanges 31, a suitable gasket 33 being provided between the companion flanges. Conduits 34, either of which may serve as the inlet conduit for reactants to be converted while the other serves as the outlet conduit for conversion products, are provided at opposite ends of the reactor tube and are secured to flanges 32 at ports 35 provided therein.

Like tube 4 of Figs. 1 and 2, tube 4' of Fig. 3 is substantially centered within or concentric with the outer tube of the assembly. Suitable spacing members 36 are provided at spaced points about the circumference of tube 4' adjacent its upper end to center the inner tube at this point and it is similarly spaced from and kept concentric with the walls of tube 30 at its lower end by members 37 which also act as supporting lugs for the central tube by resting on suitable clips 38 provided at spaced points about the wall of tube 30 on the inner surface thereof. Members 36 and 37 may be attached to tube 4' and members 38 may be attached to tube 30 by welding or in any other convenient manner. A continuous ring or the like attached to the wall of tube 30 may be substituted, when desired, for the spaced clips 38, in which case the central tube 4 may be inserted in and retracted from tube 30 through the upper end of the latter when the upper flange 32 is removed therefrom, whereas with the spaced supporting slips it may be removed and/or inserted from the bottom as well as from the top by turning it sufficiently that members 37 clear members 38 to pass by the latter.

The annular space provided between the inner tube 4 and the outer tube 30 of Figs. 3 and 4 may be substantially filled with a bed of suitable granular contact material indicated at 39 when the upper flange 32 of the assembly is removed therefrom. The catalyst bed rests, in the case here illustrated, on a perforate plate 40 supported adjacent the lower end of tube 30 on spaced clips 41 attached by welding or in any other convenient manner to the inner surface of tube 30. A suitable screen 42 may, when desired, be provided over the upper surface of perforate plate 40. To remove the granular contact material from the assembly, the lower flange 32 is removed therefrom and perforate plate 40 is then turned in such a manner that the openings 43 therethrough, provided at spaced points about its circumference, coincide with clips 41. These openings are of sufficient size to permit plate 40, when turned to this position, to fall past the clips 41 and out the lower end of tube 30, thereby releasing the catalyst bed.

While the reactants to be converted are supplied to the upper portion of the apparatus illustrated in Fig. 3 through the upper conduit 34, they pass into compartment A' of tube 4' and flow from the slot 10' of this compartment into the annular bed of granular contact material passing therethrough in the general direction indicated by the arrows in Fig. 4. The resulting conversion products, together with any unconverted reactants and inert components of the charging stock, are thence directed through slot 10' of compartment B' of the central tube 4' into compartment B' and pass from the lower end of the latter through perforate member 40 to be discharged from the apparatus through the lower conduit 34. With the stream of fluid reactants to be converted supplied to the lower portion of the apparatus through the lower conduit 34, the flow through the apparatus is exactly the reverse of that above described.

Reaction tubes of the type provided by the invention and herein illustrated may be employed singly as a reaction zone or a multiplicity of such reactor tubes may be joined in parallel to form the reactor. In either case, the disposition of the bed of catalyst or contact material within the annular space between the inner and outer tubes is advantageous in that it permits efficient heating or cooling of the reactants and contact material by circulating a suitable heating or cooling fluid about the outer tube. Thus, one or a plurality of reactor tube assemblies of the type provided may be disposed with substantially all or any desired portion of the outer tube or tubes in an enclosed zone through which the heating or cooling medium is circulated, a heating medium being thus employed when the particular reaction being conducted is strongly endothermic and a cooling medium being employed when it is strongly exothermic.

The invention specifically contemplates the use of reactor tubes of the improved type provided, not only as a means wherein catalytically promoted conversion reactions may be conducted but also as a means in which periodic reactivation of the catalytic material may be accomplished in situ. For example, many catalytically promoted hydrocarbon conversion reactions result in relatively rapid fouling of the catalyst by the deposition thereon of heavy combustible material of a carbonaceous or hydrocarbonaceous nature and, to reactivate the catalyst, a stream of hot, oxygen-containing gases is passed through the catalyst bed to burn the deleterious deposits therefrom. Ordinarily, to make the process continuous, two or more reactors are ordinarily employed, the conversion reaction being conducted in one or more of these while previously used catalyst in one or more other reactors of the group is being reactivated for further use, the individual reactors being alternately employed as zones in which the conversion reaction is conducted and as zones in which reactivation of the catalyst is accomplished. The improved reactors herein provided are ideally suited for this type of operation, reactivation being accomplished by diverting the stream of reactants to be converted from one reactor to another and supplying hot oxygen-containing gases to the first while the conversion reaction is continued in the second.

Figures 5, 6:
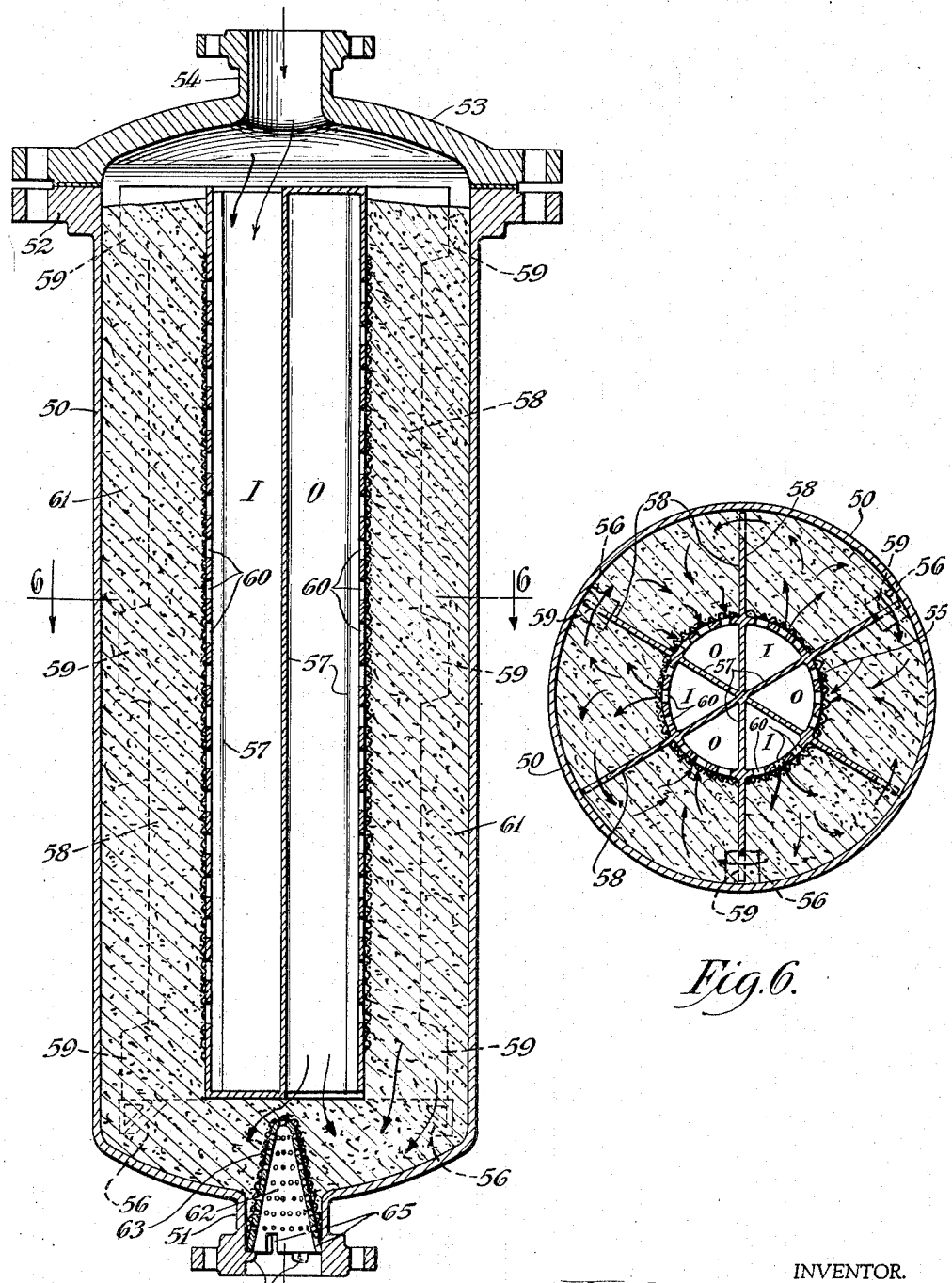
Fig. 5 is a sectional elevation of a chamber type reactor embodying the features of the invention and Fig. 6 is a cross-sectional view of the same reactor taken along the plane indicated by line 6—6 in Fig. 5.

Referring to Figs. 5 and 6, the cylindrical metallic outer shell of the reactor is indicated by the reference numeral 50 and in this particular instance is closed at the bottom except for the flanged inlet or outlet nozzle 51 and open at the top, which is also flanged as indicated at 52. The removable upper head 53, which is provided with flanged inlet or outlet nozzle 54, is secured by suitable bolts, not illustrated, to flange 52.

A central distributing and collecting conduit 55 is disposed within shell 50 and rests upon supporting lugs or the like 56 which are attached by welding or in any other suitable manner to the wall of shell 50.

A radial partition structure 57 divides the interior of conduit 55 into six longitudinal compartments, three of which are inlet and distributing compartments designated by the reference letter I and the other three of which are collecting and outlet compartments designated by the reference letter O. The partitions may be welded or otherwise suitably secured to each other at the center and to the wall of conduit 55 in such a manner as to prevent leakage between adjacent compartments.

In this particular form of reactor six longitudinal baffle plates 58 extend radially from the central conduit 55 to a point adjacent the wall of shell 50 and are joined to the wall of conduit 55 by welding or in any other convenient manner, baffles 58, in the particular case here illustrated, being in substantial alignment with the wall of the partition structure 57. The main portion of each of the baffles 58 terminates short of the interior surface of shell 50 and a plurality of extensions 59, provided at spaced points along the length of each baffle, serve to locate conduit 55 in a substantially concentric position with respect to shell 50. Three of the baffles 58 also act as a part of the supporting structure for the central conduit by resting on lugs 56 as indicated in Fig. 5.

The compartments I of the central conduit, which function to distribute the reactants admitted to the chamber through inlet nozzle 54, are open at their upper ends and closed at their lower ends, as indicated in Fig. 5, and are each provided with a plurality of spaced openings 60 which extend through the wall of conduit 55, whereby the incoming reactants are admitted to the annular space between shell 50 and conduit 55 and into contact with the bed 61 of catalytic material disposed therein. The compartments O of the central conduit, which serve to collect the conversion products and any unconverted components of the fluid reactants, are each closed at their upper ends and open at their bottom ends, as indicated in Fig. 5, and are each provided with similar spaced openings 60 through the outer walls of conduit 55 whereby communication is established between the collecting or outlet compartments and the annular space occupied by catalyst bed. Fluid reactants leaving compartments I flow through the catalyst bed around the adjacent baffles 58 into the adjacent outlet compartments and are discharged from the lower ends thereof and from the reactor through outlet nozzle 51.

To retain the catalyst bed in place in the case here illustrated, a perforate cone-shaped member 62 is provided at the lower end of the reactor over which a suitable screen 63 may be disposed, when desired. This cone rests in place in the reactor upon suitable lugs 64 in outlet nozzle 51 and corresponding slots 65 are provided along the bottom edge of member 62 which permit the latter to be dropped from the reactor through the outlet nozzle when turned to such a position that the slots coincide wih lugs 64.

I claim as my invention:

1. A reactor of the class described comprising a pair of concentric elongated tubular elements, the said tubes being spaced apart substantially throughout their length to provide an annular space therebetween adapted to contain a mass of solid granular contact material, and longitudinal partitioning means in the innermost tube forming a plurality of separate compartments therein, the tubular walls of said innermost tube being provided with openings in communication with said annular space to provide a path whereby fluid may be passed between the separate compartments through said bed of contact material.

2. A reactor of the class described comprising a pair of concentric elongated tubular elements spaced apart to provide a chamber therebetween adapted to contain a mass of solid granular contact material, the inner tube being partitioned into a plurality of separate longitudinal compartments by partitioning means therein and provided with openings extending along the length of said inner tube through the outer wall of each compartment whereby fluid supplied to one of said compartments may flow through the openings therein into contact with said bed and from the latter into an adjacent separate compartment through said openings in the latter.

3. A reactor of the class described comprising two concentrically disposed elongated tubular elements having an elongated annular space provided therebetween adapted to contain a mass of solid granular contact material, the inner tube being provided with a centrally disposed longitudinal partition dividing it into two separate longitudinal compartments, openings being provided through the outer wall of said inner tube along the length of the latter on opposite sides of said partition and at substantially diametrically opposite points on the circumference of the tube, whereby fluid may flow from one of said compartments in substantially semi-circular paths through the annular bed of contact material into the other compartment, means for introducing fluid to the first compartment and means for removing fluid from the other compartment.

4. A reactor of the class described comprising two concentrically disposed elongated tubular elements, an elongated annular space being provided between the concentric tubes adapted to contain a bed of solid granular contact material, a plurality of longitudinal partitions within said central tube dividing it into a multiplicity of separate longitudinal compartments, alternate compartments being open at one end of the central tube and closed adjacent their opposite ends, the compartments which are open at the top being closed at the bottom and the partitions which are closed at the top being open at the bottom, the outer wall of said central tube being provided with openings therethrough to provide communication between said compartments and the space occupied by said bed of contact material.

5. The apparatus set forth in claim 4, further characterized by longitudinal baffles disposed in said annular space and secured to the walls of said central tube substantially mid-way between the openings therethrough from adjacent compartments.

6. A reactor of the class described comprising, in combination, an elongated substantially cylindrical tubular element having ports of reduced cross-sectional area adjacent its opposite ends, an elongated distributing and collecting tube disposed concentrically within the first named tube, the central tube being adapted to pass through the port in one end of the outer tube, the port at the opposite end of said outer tube being adapted to receive one end of the central tube, means to prevent the central tube from passing through the last named port, the central tube being sufficiently shorter than the outer tube that the end of the central tube adjacent the port through which it is adapted to pass terminates short of the latter, a sleeve for spanning and closing the space between the last named port and the adjacent end of the central tube, means for retaining said sleeve in position, a longitudinal partition within said central tube dividing the interior thereof into separate compartments, one compartment being closed adjacent one end of the central tube and open at the opposite end and the other compartment being open at the first named end and closed adjacent its opposite end, said central tube having openings provided through its outer walls on opposite sides of said partition and at substantially diametrically opposite points in said walls.

7. A reactor of the class described comprising, in combination, an elongated substantially cylindrical shell including closure means at the opposite ends thereof, at least one of said closure means being detachable from the shell and each of said closure means having a port provided therethrough, a tubular element of smaller diameter than said shell disposed concentrically within the latter and terminating short of the opposite ends thereof, a perforate member disposed within the space between the lower ends of said tubes and releasably secured to the shell, means releasably supporting the central tube from the wall of the shell and spacing the central tube therefrom, a partition structure within said central tube dividing the latter into a plurality of longitudinal compartments, half of said compartments being closed adjacent the upper end of the central tube and open at the lower end thereof and the other half of said compartments being open at the upper end of the central tube and closed adjacent its lower end, and openings being provided through the wall of said central tube along the length of the latter which establish communication between each of said compartments and the annular space between said central tube and the shell.

8. The apparatus defined in claim 7, wherein more than two compartments are provided in the central tube and said supporting and spacing means for the central tube comprise longitudinal baffles disposed within said annular space and secured to the central tube between said openings in the latter from adjacent compartments.

JOHN WOODS McCAUSLAND.